United States Patent
Knoblich et al.

(10) Patent No.: US 11,300,772 B2
(45) Date of Patent: Apr. 12, 2022

(54) IMMERSION OBJECTIVE AND IMMERSION MICROSCOPY METHOD

(71) Applicant: Carl Zeiss Microscopy GmbH, Jena (DE)

(72) Inventors: Johannes Knoblich, Jena (DE); Ingo Fahlbusch, Göttingen (DE); Markus Sticker, Jena (DE); Ralf Wolleschensky, Jena (DE); Thomas Ohrt, Golmsdorf (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 17/239,994

(22) Filed: Apr. 26, 2021

(65) Prior Publication Data
US 2021/0341722 A1 Nov. 4, 2021

(30) Foreign Application Priority Data
Apr. 29, 2020 (DE) ...................... 10 2020 111 715.9

(51) Int. Cl.
*G02B 21/33* (2006.01)
*G02B 21/04* (2006.01)
*G02B 21/02* (2006.01)

(52) U.S. Cl.
CPC ........... *G02B 21/33* (2013.01); *G02B 21/025* (2013.01); *G02B 21/04* (2013.01)

(58) Field of Classification Search
CPC .. G02B 21/0088; G02B 21/02; G02B 21/025; G02B 21/04; G02B 21/082; G02B 21/12; G02B 21/33; G02B 21/34; G02B 21/24; G02B 21/26; G02B 21/245; G02B 21/247;

(Continued)

(56) References Cited

U.S. PATENT DOCUMENTS

| | | |
|---|---|---|
| 3,837,731 A | 9/1974 | Amos et al. |
| 7,304,793 B2 | 12/2007 | Hummel |
| 7,961,384 B2 | 6/2011 | Pirsch |

(Continued)

FOREIGN PATENT DOCUMENTS

| | | |
|---|---|---|
| DE | 10123027 A1 | 11/2002 |
| DE | 10333326 A1 | 3/2005 |

(Continued)

OTHER PUBLICATIONS

Dorsch, Rainer, Search Report for DE102020111715.9, dated Dec. 4, 2020, 5 pages (English translation not available).

(Continued)

*Primary Examiner* — Mustak Choudhury
(74) *Attorney, Agent, or Firm* — LaBatt, LLC

(57) ABSTRACT

An immersion objective comprises an objective body in which optical components are accommodated, at least one immersion fluid tank and at least one objective-body coupling connection on the objective body. The immersion fluid tank can be supported in a detachable manner via the objective-body coupling connection. At least one pump is supported via the objective body, wherein the pump is arranged in order to convey immersion fluid from the immersion fluid tank to an objective front side. A control electronics component is supported via the objective body and is configured to control the at least one pump.

20 Claims, 9 Drawing Sheets

(58) Field of Classification Search
CPC ... G02B 21/248; G02B 27/0006; G02B 7/028
See application file for complete search history.

(56) References Cited

U.S. PATENT DOCUMENTS

| | | | |
|---|---|---|---|
| 8,199,407 | B2 | 6/2012 | Liebel et al. |
| 9,658,426 | B2 | 5/2017 | Fahlbusch |
| 9,939,625 | B2 | 4/2018 | Herrmann et al. |
| 9,958,664 | B2 | 5/2018 | Scheps et al. |
| 10,649,194 | B2 | 5/2020 | Kalkbrenner et al. |
| 2007/0047093 | A1 | 3/2007 | Hoering et al. |
| 2007/0291360 | A1 | 12/2007 | Pirsch |
| 2010/0027109 | A1* | 2/2010 | Liebel ............... G02B 27/0006 359/381 |
| 2017/0123198 | A1* | 5/2017 | Singer ............... G02B 21/02 |
| 2018/0314048 | A1 | 11/2018 | Scheps et al. |
| 2019/0101740 | A1 | 4/2019 | Kalkbrenner et al. |
| 2020/0271912 | A1 | 8/2020 | Pergande et al. |

FOREIGN PATENT DOCUMENTS

| | | |
|---|---|---|
| DE | 102005040828 A1 | 3/2007 |
| DE | 102006042088 A1 | 3/2008 |
| DE | 102013006997 A1 | 10/2014 |
| DE | 102013011544 A1 | 1/2015 |
| DE | 102015200927 A1 | 7/2016 |
| DE | 202020017000475 U1 | 2/2017 |
| DE | 102017217380 A1 | 4/2019 |
| EP | 1717628 A1 | 11/2006 |
| JP | 2005234458 A | 9/2005 |
| JP | 2010026218 A | 2/2010 |
| WO | 2008028475 A2 | 3/2008 |
| WO | 2019016048 A1 | 1/2019 |
| WO | 2019063782 A2 | 4/2019 |

OTHER PUBLICATIONS

Dorsch, Rainer, Search Report for DE102020111715.9 with English translation, dated Dec. 4, 2020, 9 pages.

* cited by examiner

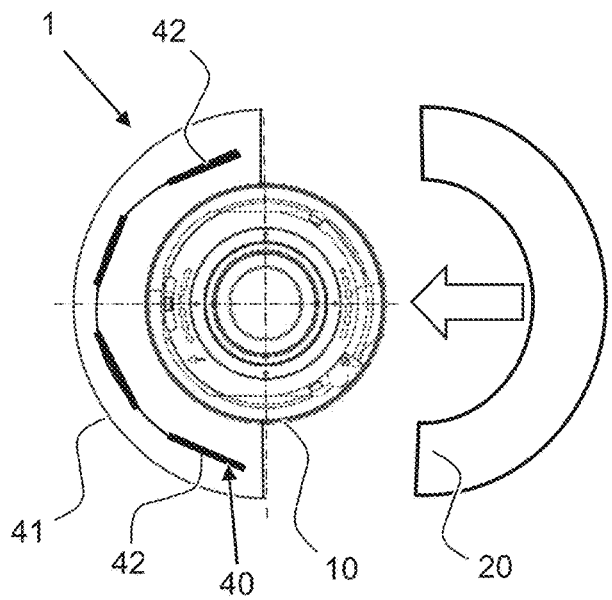
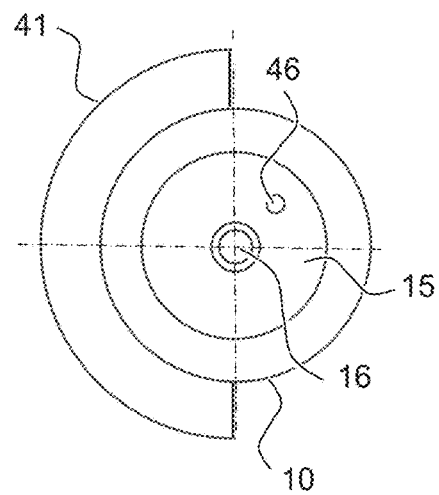
Fig. 3A
Fig. 3B
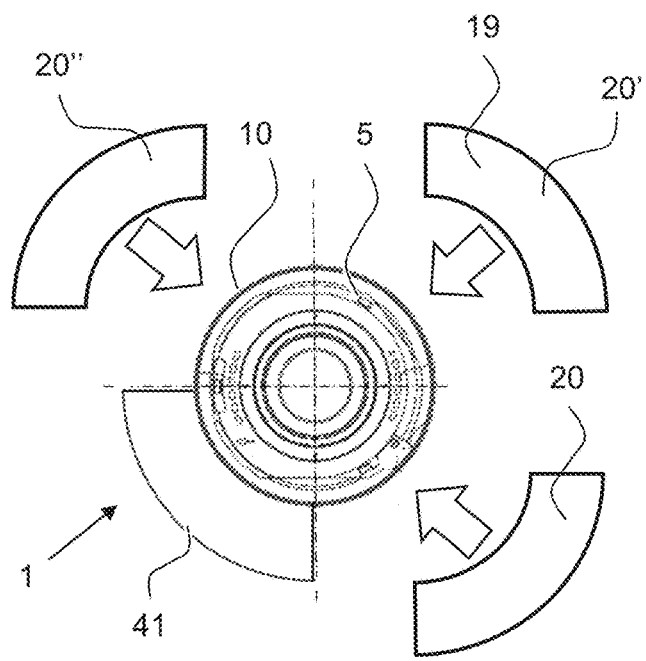
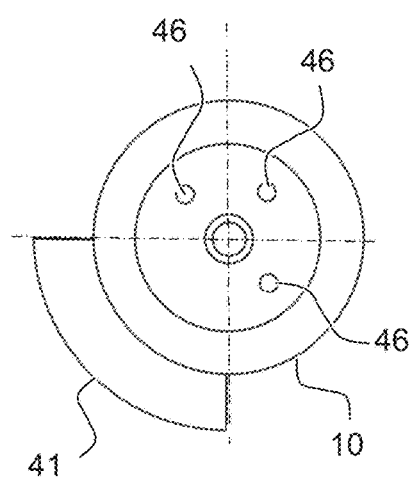
Fig. 4A
Fig. 4B

| 10 | β | NA | d | V |
|---|---|---|---|---|
| LCI Plan-Neofluar 25x/0.8 Imm | 25 | 0.8 | 0.21 | 6 |
| C-Apochromat 40x/1.2 W Corr | 40 | 1.2 | 0.28 | 8 |
| LD C-Apochromat 40x/1.1 W Corr | 40 | 1.1 | 0.62 | 18 |
| C-Apochromat 63x/1.2 W | 63 | 1.2 | 0.28 | 8 |
| LD LCI Plan-Apochromat 63x/1.2 Imm | 63 | 1.2 | 0.49 | 14 |
| LCI Plan-Neofluar 63x/1.3 Imm Corr PH3 | 63 | 1.3 | 0.17 | 5 |
| C-Apochromat 100x/1.25 W Corr | 100 | 1.25 | 0.25 | 7 |
| C-Apochromat 10x/0.45 W | 10 | 0.45 | 1.8 | 51 |
| LD LCI Plan-Apochromat 25x/0.8 Imm Corr DIC | 25 | 0.8 | 0.57 | 16 |

Fig. 10

IMMERSION OBJECTIVE AND IMMERSION MICROSCOPY METHOD

REFERENCE TO RELATED APPLICATIONS

The current application claims the benefit of German Patent Application No. 10 2020 111 715.9, filed on 29 Apr. 2020, which is hereby incorporated by reference.

FIELD OF THE DISCLOSURE

The present disclosure relates to an immersion objective and an immersion microscopy method.

BACKGROUND OF THE DISCLOSURE

Immersion objectives are used in numerous light microscopy applications. An immersion objective is an objective whose front side is immersed in an immersion medium (immersion fluid) during operation. The immersion fluid is applied, for example, on a cover slip under which a sample to be analysed is located.

Immersion fluids should generally be applied in a controlled and targeted manner. This is frequently carried out manually, which requires practice by the user. With electronically controlled immersion devices, it should be possible to apply, in particular to a precisely defined location, an amount of immersion fluid that can be set or replicated with precision. In the case of long-term analyses, a precise addition of immersion fluid should be possible. At the same time, a simple operability for a user is desired without manual imprecisions effected by a user potentially leading to an imprecise application of immersion fluid. Moreover, for a simple operability, a compact design of the overall immersion system is desired. It should be avoided that the different components used for immersion fluids get in the way and impede the handling of the microscope. In particular, the function of other microscope components should ideally not be adversely affected by an immersion device.

Numerous immersion systems for the automated feeding of the immersion fluid are known in the prior art, which, however, do not completely satisfy the aforementioned objects.

EP 1 717 628 B1 describes an immersion objective to which immersion fluid tubes for a feeding and removal immersion fluid are fixed. Immersion fluid tanks with corresponding pumps are provided separately from the immersion objective. The overall system is relatively large and the guiding of the tubes to the objective could be a hindrance, for example in the event of a changing of the objective via an objective revolver or when other microscope components such as an overview camera are used at the same time.

Similarly, WO 2019/016048 A1 describes an objective to which a channel from a separate immersion fluid tank leads. The necessary pump and the immersion fluid tank limit a flexible handling of the microscope. Moreover, a special elastically mounted attachment is required, which must be designed for a specific objective.

In DE 10 333 326 B4, the immersion fluid is brought via a feed tube from an immersion fluid reservoir positioned at a distance to the front area of the objective. An attachment comprising a capillary channel, to which a suction device for the removal of immersion medium is attached, is connected to the objective.

In DE 10123027 B4, the immersion medium is fed directly into the immersion area between the slide and the front of the objective via a feed tube (capillary) by means of an immersion device positioned outside the objective. The immersion medium which is subsequently to be removed is led off via a tube and a corresponding collection device located outside the objective.

DE 10 2005 040 828 A1 describes a fully automated microscope system which, in addition to an automated immersion operation, also enables an automatic cleaning of the front lens of the microscope objective at the end of an immersion operation. The components necessary for the application and removal of the immersion fluid are arranged next to the microscope stand. Tubes for the immersion fluid must be arranged accordingly for the feeding and removal of immersion fluid.

WO 2019/063782 A2 describes an immersion objective and an immersion device that is provided separately from the immersion objective. Formed in a front lens of the immersion objective are channels to which the immersion device is connected for the conveyance of immersion fluid via the same to the area between the slide and the front lens.

DE 10 2017 217 380 A1 discloses a feed component for immersion media. The feed component is arranged at a distance from the objective and comprises a medium conduit through which a pump conveys the immersion fluid to the front area of the objective.

In DE 10 2013 011 544 A1, a protective device for preventing a leakage of fluid from the immersion film area and a device for the automatic feeding of the immersion fluid into the immersion film area are used on an inverted microscope. The protective device is arranged statically in the main body of the microscope stand. The device for feeding the immersion fluid into the immersion film area includes an aquastop system which communicates with the protective apparatus.

DE 10 2006 042 088 B4 and U.S. Pat. No. 3,837,731 A respectively describe an objective to which a kind of cap is fixed. The cap supports a tube or comprises a channel for the feeding and removal of immersion fluid. Similarly, JP 2005 234 458 A describes an immersion device positioned at a distance from the objective, from which tubes lead to the objective.

DE 10 2015 200 927 A1 describes an immersion device formed separately from the objective. The objective and parts of the immersion device can be supported so as to be adjacent to one another on the objective revolver. Due to the size of the immersion device, an immersion fluid tank is once more located at a distance and is connected to the parts on the objective revolver via a tube. No mechanical modification of the objective used is necessary here, which enables an improved handling and a continuous working with different objectives. To this end, the injection device must be arranged far enough away from the objective that a changing of the objective by means of the objective revolver and the moving of the microscope stage can take place unhindered. For this purpose, the injection device can be arranged in particular on the axis of the objective revolver or directly on the microscope stand outside the installation space of the objective revolver. An unhindered injection of the immersion medium to the slide is thus possible. As a result of this arrangement of the injection device on the microscope stand, the stream of immersion fluid must be injected over a distance of approx. 20-30 mm. Due to this relatively large distance, the stream of immersion fluid must be configured with regard to its parameters (e.g. flow speed, stream diameter, stream characteristics) in such a manner that the immersion fluid volume required for the objective in question reaches the desired site of impingement on the slide entirely and reliably. One problem here is the tendency, resulting from the flow energy of the stream of immersion fluid, for air bubbles to form both in the stream itself as well as at the site of impingement in the emerging immersion fluid meniscus (initial immersion) or in the already existing immersion fluid meniscus (supplemental immersion) between the objective and the slide. For microscopic applications, air bubbles visible in the object field are undesirable. Moreover, air bubbles in the immersion area can lead to microscope malfunctions, e.g. of the autofocus system. As a result, due to this injection technology's issue with air bubbles, extensive measures for avoiding and reducing bubbles have been proposed, e.g., an optimization of the pump parameters, a degassing of the immersion medium or "bubble removal exercises" by varying the microscope stage.

DE 20 2017 000 475 U1 describes an immersion fluid component which is arranged separately from the objective and which injects immersion fluid from a certain distance to the front area of the objective via an injection device.

In terms of flow characteristics and with regard to an immersion with as few bubbles as possible, the introduction of the immersion medium in proximity to the sample is advantageous. The necessary equipment for this purpose, at least a tube or channel, must thus be positioned or fixed on the objective itself or in direct proximity to the objective. This is technically challenging due to the limited space for the installation of components between the objective and the sample and could increase the risk of collisions during use. The feeding and removal of the immersion medium via tubes must also be ensured. This complicates or limits the use of the microscope, e.g., with regard to changing the objective, focussing, manipulation or incubation. Due to the considerable space requirements of the immersion device (cannulas, immersion caps, tubes, immersion fluid containers, external pumps, etc.) and the concomitant risk of collision, a combination with other microscope components can also be problematic, e.g., with overview cameras, sensors or aquastop/accident-prevention devices. These are protective devices for the prevention of the penetration of immersion or sample fluids into the microscope, in particular in the case of inverted microscopes. Functional limitations may result in some cases, e.g. an objective change that is limited with respect to its direction of rotation. It can also be necessary to move the immersion device into a parked position when not in use in order to avoid further limiting other microscope functions.

A relatively compact design is obtained with a generic immersion objective. This comprises an objective body in which optical components are accommodated, at least one immersion fluid tank and at least one objective-body coupling connection on the objective body. The immersion fluid tank is supportable in a detachable manner via the objective-body coupling connection. The immersion fluid tank can be supported on the objective-body coupling connection directly or indirectly via intermediate components on the objective-body coupling connection.

Accordingly, a generic immersion microscopy method comprises an immersion objective with an objective body in which optical components are accommodated and at least one immersion fluid tank which is supported in a detachable manner via at least one objective-body coupling connection on the objective body.

Generic immersion objectives are known, e.g., from JP 2010 026 218 A and WO 2008/028475 A2.

JP 2010026218 A describes an immersion device in which an immersion fluid container is attached separately to the outside of the objective. The other necessary functional and control elements of the immersion device are located at a distance from the objective. In WO 2008/028475 A2, an immersion fluid tank can be supported on the objective in a similar fashion. To this end, a cap with immersion fluid channels is located on the objective and the immersion fluid tank is plugged into the cap. Other components of the immersion device (in particular a functional component that can comprise a pump and control electronics) are fixed to the objective revolver separately from the objective.

In order to increase the functionality of an objective, an objective socket with an electrical interface is described in DE 10 2013 006 997 A1.

Known immersion systems are limited with respect to their flexibility and handling. In part, specific and precise arrangements of the components must be carried out. In other cases, if used carelessly, there is the risk of collisions with components of the immersion system.

SUMMARY OF THE DISCLOSURE

The indication of an immersion objective and an immersion microscopy method which allow an automated, precise feeding of immersion fluid, with easy handling and without undue obstruction of other microscope functions, can be considered an object of the invention.

This object is achieved by means of the immersion objective and by means of the method described below.

An immersion objective according to an embodiment of the invention comprises:
- an objective body in which optical components are accommodated;
- at least one immersion fluid tank; and
- at least one objective-body coupling connection on the objective body, wherein the objective-body coupling connection is configured to support the immersion fluid tank in a detachable manner;
- at least one pump, which is supported via the objective body, wherein the pump is arranged for the conveyance of immersion fluid from the immersion fluid tank to an objective front side; and
- a control electronics component, which is supported via the objective body, wherein the control electronics component is configured to control the pump.

An immersion microscopy method according to an embodiment of the invention uses an immersion objective comprising an objective body, in which optical components are accommodated, and at least one immersion fluid tank, wherein the at least one immersion fluid tank is supported in a detachable manner on the objective body via at least one objective-body coupling connection. The method comprises conveying immersion fluid from the immersion fluid tank to an objective front side by means of at least one pump which is supported via the objective body; and controlling the at least one pump by means of the control electronics component which is supported via the objective body.

All components necessary for immersions may be arranged on the objective and be supported by the same. These components comprise at least the immersion fluid tank, the pump for immersion fluid and the corresponding control electronics component. The components in question can be supported on the objective body directly or via intermediate components on the objective body. In contrast to the known prior art, this obviates the need for discrete immersion devices that are spatially separate from the objective being used. The risk of collisions with components of a separate immersion device during the changing of an objective is thereby avoided. Other microscope functions are not or hardly hindered on account of the small size of the immersion device integrated on the objective. The user is spared a precise positioning of parts of the immersion device, as the correct position of the immersion fluid components is already determined by the position of the objective. Furthermore, the immersion objective according to the invention can be readily used with a variety of different light microscopes, as modifications of the light microscope or special arrangements of immersion fluid components on the microscope stand or on the objective revolver are not necessarily required. Herein lies a significant difference from the prior art discussed above, in which parts of the immersion device (for example the pump) invariably have to be arranged separately on the objective revolver or on the stand.

For example, the invention can enable an automated feeding of immersion fluid, in particular in the form of a supplemental immersion, in long-term experiments, some of which last several days. This advantage is particularly relevant when compared to cases where a supplemental immersion would have to be carried out manually, e.g. every 30 min., by a user.

Optional Embodiments

Advantageous variants of the immersion objective according to the invention and of the method according to the invention are the object of the dependent claims and are explained in greater detail in the following description.

Objective-Body Coupling Connection

The objective-body coupling connection can be understood as a connection for mechanical support and optionally for electrical connection. The mechanical support and electrical connection functions can be performed by spatially separate parts of the connection. For example, the mechanical support may be provided by a clamping connection, a plug/socket connection, a tensioned connection or a threaded connection. An electrical contact may be provided at a distance therefrom, e.g. by electrical contact pins or surfaces that are elastic or spring-mounted. For a compact structure, however, it is also possible for the same connection part to effect both the electrical contacting as well as the mechanical support of the connected components. The objective-body coupling connection can comprise an electrical plug/socket connector (hereinafter: objective-body plug/socket connector) or be constituted by such, wherein the plug/socket connector, depending on its design, reinforces the mechanical support or is solely responsible for said support.

The objective-body coupling connection can also comprise a magnetic coupling point instead of or in addition to a mechanical connection.

At least one immersion fluid tank is supported via the at least one objective-body coupling connection. Optionally, the at least one pump can also be supported via the same connection. In principle, the objective-body coupling connection here can comprise separate connection parts (e.g. plug/socket connectors) for the immersion fluid tank and the pump. A compacter design, however, is one in which the objective-body coupling connection comprises merely a sole connection part or a sole electrical connection via which both an immersion fluid tank and a pump can be supported or electrically contacted. For example, the immersion fluid tank can be designed to be connected directly to the objective-body coupling connection and the pump can be supported in or on the immersion fluid tank. Alternatively, a pump adapter, which will be described in greater detail later on, can be connected directly to the objective-body coupling connection and the immersion fluid tank is connected to the pump adapter. In principle, other intermediate components (for example, sleeves, mounting brackets, the control electronics component or parts of the same) can also be connected directly to the objective-body coupling connection, wherein the immersion fluid tank and the pump are connected to the objective-body coupling connection via this/ these intermediate component(s).

The immersion objective can comprise an electrical interface together with a mechanical mounting connection for the attachment of the immersion objective, for example a bayonet mount or a thread for attachment to the objective revolver or stand, wherein an electrical contact is also provided. The control electronics component, which is supported via the objective body, can now be electrically connected both to the electrical interface as well as to the objective-body coupling connection. The control electronics component can thereby receive control commands and/or electrical energy via the electrical interface and can control the pump via the objective-body coupling connection and, depending on its configuration, also communicate with optional electrical parts of the immersion fluid tank, in particular with a fill-level sensor.

In other words, the objective-body coupling connection may be configured to establish an electrical connection also with components of the immersion fluid tank, in particular with a fill-level sensor of the immersion fluid tank.

In some variants, the immersion objective is suitable for inverted as well as upright microscopy. The immersion objective is rotated 180° in the event of such a transition. An immersion fluid tank, however, depending on its design, cannot be operated correctly in an inverted position (upside down), as the pump, in the event that the immersion fluid tank is only partially filled, could draw air and not immersion fluid. To solve this problem, it is advantageous if the immersion fluid tank can also be supported on the objective-body coupling connection in a position rotated 180° relative to the objective body. In particular, the objective-body coupling connection or its electrical connection can be designed to be symmetrically contactable so that the immersion fluid tank is supportable in different orientations for inverted and upright microscopy. For example, a symmetrically structured electrical plug/socket connector can be used. Designs are also possible in which the objective-body coupling connection comprises two separate mechanical mounts (and/or two separate electrical connection means), of which one is used for inverted microscopy while the other is used for upright microscopy. It is also possible with such designs to couple an immersion fluid tank with the objective body in two orientations which are rotated 180° in relation to one another.

The objective-body coupling connection can in particular be located at mid-height on the objective body, i.e. symmetrically in relation to the height of the latter. This is advantageous in order to avoid, in the cases of both inverted and upright microscopy (i.e. regardless of the orientation in which it is supported via the objective-body coupling connection), that the immersion fluid tank protrudes beyond the objective front side or the mounting connection of the objective.

In order for the immersion objective to be usable in both an inverted as well as an upright arrangement, a fluid connection to the immersion fluid tank can also be pivotable. The fluid connection can in particular lock in two specific pivot positions. The two pivot positions differ from each other in the height between the objective front side and the mounting connection of the objective. For the inverted and upright arrangements, the pivot position is used which is respectively lower. The pump thereby suctions immersion fluid from the lower area of a connected immersion fluid tank via the fluid connection. In some cases, it may be necessary to use differently designed immersion fluid tanks for the upright and inverted arrangements.

Immersion Fluid Tank

An immersion fluid tank can generally be understood to be a fluid container.

Depending on its design, each immersion fluid tank is connected to the objective-body coupling connection directly or via intermediate components. For a direct connection, each immersion fluid tank can comprise a mating plug or socket, which is formed so as to be apt for connection to the objective-body coupling connection. Depending on its design, the mating plug/socket can provide mechanical support only or also an electrical connection. To this end, the mating plug/socket can be configured, e.g., as an electrical plug/socket connector.

In particular if the immersion fluid tank is connected directly to the objective-body coupling connection, the corresponding pump can be accommodated in said immersion fluid tank. Compact pumps, often referred to as micropumps, can thus be accommodated in a space-saving manner and with a small number of mechanical plug-in connections.

Each immersion fluid tank can comprise an air vent valve. This can be arranged on the immersion fluid tank at an end opposite the pump. The pump can thus be located in the lower area of the immersion fluid tank during operation, while the air vent valve is at the upper end. By means of the air vent valve, a negative pressure, which would hamper a precisely dosed conveyance of immersion fluid by the pump, is avoided in the immersion fluid tank when in a partially filled state.

Each immersion fluid tank can also comprise a fill-level sensor that can be electrically connected to the objective-body coupling connection, in particular by means of the mating plug/socket of the immersion fluid tank.

Each immersion fluid tank can comprise a refill opening for the refilling of immersion fluid. A valve or cap on the refill opening can prevent contaminants from entering while immersion fluid can be refilled via, e.g., a syringe. The refill opening is advantageously located in a position opposite the site of the pump, i.e. on the upper end of the immersion fluid tank. Refilling can occur while the immersion objective is mounted on a light microscope and in operation. This can be a significant advantage in long-term experiments.

The aforementioned features are particularly suitable when the immersion fluid tank has rigid outer walls. Alternatively, however, an immersion fluid tank can also be designed as a flexible tank whose walls contract as the volume of the immersion fluid it contains decreases. A flexible bag (collapsing bag) is also possible as the immersion fluid tank or in the described immersion fluid tank, wherein the immersion fluid is accommodated in the bag. In these designs with flexible walls, the volume of the bag decreases when the amount of contained immersion fluid is reduced. The pump can thus empty the bag regardless of the location of a pump connection on the bag. As a result, the structure consisting of a pump and an immersion fluid bag can advantageously be used with both inverted and upright microscopes without having to effect different orientations of the pump and bag in relation to the objective body. The bag can be emptied in both cases largely completely without the pump drawing air. User friendliness is thus enhanced.

Pump Adapter

It can also be provided that an immersion fluid tank is not connected directly to the objective-body coupling connection, but rather via an intermediate component, which can in particular be a pump adapter. A pump adapter comprises a mating plug/socket for connecting to the objective-body coupling connection, the pump, which is electrically connected to the mating plug/socket, and a support bracket for supporting the immersion fluid tank in a detachable manner. The mating plug/socket of the pump adapter can in particular be designed as an electrical plug/socket connector or comprise one. This design is particularly well-suited to a use of an immersion fluid tank as a disposable immersion fluid tank: more costly parts like the pump are detached from the immersion fluid tank so that the tank can be designed particularly simply and cost-effectively as a disposable component.

The support bracket of the pump adapter for the immersion fluid tank can either be purely mechanical or also provide an electrical connection. To this end, the support bracket can be designed, for example, as an electrical plug/socket connector and the immersion fluid tank comprises a matching plug/socket connector. The electrical connection can be used for, e.g., a fill-level sensor.

Optionally, each immersion fluid tank can have a respective receiving recess for receiving the respective pump in its lower area. In particular, the part of the pump adapter in which the pump is located can thus be inserted in the receiving recess. This arrangement can be particularly space-saving. Moreover, the receiving recess can also be formed for mechanical support on the pump or pump adapter, in particular for an interlocking support. The receiving recess can thus also contribute to the mechanical support of the immersion fluid tank on the pump adapter in addition to the plug/socket connector (mating plug/socket).

A pump adapter can be L-shaped in cross section, wherein a long side of the L shape fits against the objective body. A part protruding from the long side, in which part the pump is located, protrudes into the receiving recess of the immersion fluid tank.

Each immersion fluid tank can comprise a pump coupling in its lower area. This is designed for the fluid connection of the pump and prevents a leakage of immersion fluid through the pump coupling when the pump is not connected. The lower quarter of the immersion fluid tank, for example, can be understood to be the lower area of an immersion fluid tank. Accordingly, the upper quarter of the immersion fluid tank can designate the upper area.

Control Electronics Component

The control electronics component is configured to control the pump(s) and can optionally also communicate with all other electrical or electronic components of the immersion objective. For example, the control electronics component can retrieve the current fill level of an immersion fluid tank from a fill-level sensor. If immersion fluid tanks respectively comprise a chip on which identification data as well as information regarding the contained immersion fluid are saved, the control electronics component can also read such data of the chip.

The control electronics component can optionally further be configured to selectively control the pump or one of the pumps either to pump immersion fluid from the immersion fluid tank to the objective front side or conversely to pump immersion fluid away from the objective front side to the immersion fluid tank.

The control electronics component can be accommodated in a control electronics housing, which can be designed so as to be detachable from the objective body. To this end, the control electronics housing can in particular comprise a plug/socket connector via which the control electronics housing is electrically connected to and optionally mechanically supported on the objective body. This facilitates its flexible use. For example, the same control electronics component can be used successively with different objectives or a control electronics component can be replaced by a newer one without other components of the immersion objective having to be discarded.

Alternatively, the control electronics housing can also be solidly connected to the objective body or be formed by common sleeves or housing parts.

If the objective body comprises a plug/socket connector to which the control electronics housing is connected, then the plug/socket connector can be located closer to the mounting connection of the objective than to the objective front side. In contrast to the objective-body coupling connection, the plug/socket connector for connecting the control electronics housing to the objective body can have a keyed shape. This allows a connection in a sole orientation so that the control electronics housing can only be fixed in the desired position in relation to the objective body.

A control electronics housing or the above-described control electronics housing can have a ring segment shape in cross section (perpendicularly to the longitudinal axis of the immersion objective). In particular, an inner side with a circle segment shape can fit against the objective body. An outer side of the control electronics housing can also have a circle segment shape, which yields an overall space-saving system while undesired collisions with other microscope components become less likely. The ring segment shape of the control electronics housing can form a closed ring shape in conjunction with one or more immersion fluid tanks respectively having a ring segment shape. This ring surrounds the objective body, which is generally circular in cross section.

In order for the control electronics component to be able to use the room in the housing with the ring-segment shape efficiently, the control electronics component can comprise circuit boards in rigid-flex technology. A plurality of circuit boards can be connected by flexible broadband wires so that the circuit boards extend in the shape of a ring segment when viewed together.

Arrangement of the Immersion Fluid Tank(S)

The at least one immersion fluid tank, like the control electronics housing, can be arranged around the objective body in the shape of a ring segment. Each immersion fluid tank can respectively have an inner side with a circle segment shape, which fits against the objective body. The outer side, viewed radially from the objective axis, of each immersion fluid tank can optionally also have the shape of a circle segment.

There can also be at least two immersion fluid tanks arranged on the objective body for different immersion fluids. The objective body can accordingly have respective coupling connections for the plurality of immersion fluid tanks.

A Y-channel (Y-shunt) can optionally be connected to the two immersion fluid tanks or to two of the immersion fluid tanks directly or via two tubes. By means of the Y-channel, the contained immersion fluids, for example glycerine and water, can be mixed. A sole tube subsequently guides the mixture to the objective front side. The control electronics component can set a mixing ratio of the two immersion fluids by means of a corresponding control of the respective pumps.

In principle, variations of different-sized immersion fluid tanks forming, for example, a quarter ring or a half ring in cross section can also be used. Two smaller immersion fluid tanks (respectively with, e.g., the shape of a quarter ring) are thus attached to adjacent objective-body coupling connections; in contrast, a larger immersion fluid tank (e.g. with the shape of a half ring) would contact only one of the objective-body coupling connections electrically and would comprise a recess or solely a mechanical support bracket or electrical contact for the adjacent objective-body coupling connections.

In addition, a residual immersion fluid tank can also be arranged on the objective body, in particular via an additional objective-body coupling connection. A residual immersion fluid pump is supported via the objective body and arranged to suction immersion fluid from an objective front side to a residual immersion fluid tank. In principle, the residual immersion fluid tank and the residual immersion fluid pump can be designed in the same manner as the described immersion fluid tank and its pump.

Tube for Immersion Fluid

The immersion fluid can be transported from an immersion fluid tank to the objective front side with the aid of the pump via, for example, channels in the objective body, channels in optical components in the objective body and/or via a tube.

Each pump or each immersion fluid tank can comprise a tube connector fitting for connecting a tube. At least one replaceable tube is attached to the tube connector fitting in a detachable manner and leads to the objective front side. In particular, one tube can be provided per pump. If a Y-channel is connected to two tube connector fittings of two pumps, a single tube is accordingly used for two pumps (i.e. for two immersion fluid tanks).

If a tube leads all the way from the tube connector fitting to the objective front side, no other components are contaminated by immersion fluid residues or the potential formation of germs besides the tube. If the tube is replaced, an otherwise laborious cleaning, as required in systems of the prior art, is no longer necessary. The tube can in particular be used once and then replaced or be replaced after a predetermined number of immersion operations. The control electronics component can optionally be configured to provide an indication to a user (e.g. via the electrical interface of the immersion objective) that the tube should be changed. The tube connector fitting is advantageous for the simple connection of the tube, although a mechanical interlocking or clamping connection and/or a tube guide channel or a guide groove can additionally be provided in the area of the objective front side. The tube guide channel accommodates the tube and does not itself come into contact, or negligibly, with immersion fluid, whereby a laborious cleaning of the tube guide channel is no longer necessary or is necessary less frequently. The tube or a channel can optionally also lead to a perforation in the front lens.

A filter can be provided at the end of the tube or channel, i.e. in the area of the objective front side. The filter can be fixed on the tube itself or on the objective front side. In an embodiment on the tube, the filter can easily be replaced together with the tube. By means of a filter, the formation of air bubbles in the outgoing immersion fluid is avoided. Air bubbles would interfere, for example, with an autofocusing system or the viewing of the sample.

The described tube can be configured either as one piece or as a plurality of tube sections placed end to end, in particular as described in greater detail in the description of the figures.

Pump

The pump can be understood to designate every device suitable for conveying the immersion fluid from an immersion fluid tank or for conveying immersion fluid to a residual immersion fluid tank. Compact dimensions of the pump in the form of a micropump are advantageous. The pump can be designed, for example, as a piezoelectric pump, as an electroosmotic pump or as a tube pump. In the case of a tube or peristaltic pump, the pump effects an outer mechanical deformation (pillowing) of the tube so that a medium is conveyed in the same. In the process, the tube pump does not itself come into contact with the conveyed medium, i.e. the immersion fluid, so that contaminations of the tube pump do not occur. If an immersion fluid tank is designed as a flexible bag, then the pump can also be a device which exerts a pressure on the bag.

In particular when the pump does not come into direct contact with immersion fluid, it is not absolutely necessary to render the pump replaceable. The different described embodiments can thus be modified so that the at least one pump is permanently installed in or on the objective body. The pump can also be arranged next to the control electronics component, in particular in the control electronics housing.

A separate pump can be provided for each immersion fluid tank. In principle, a plurality of pumps or immersion fluid tanks can be connected via the same objective-body coupling connection, although it can be provided for simple handling that each immersion fluid tank is to be connected to a respective objective-body coupling connection.

General Features

Immersion objective: An immersion objective denotes an objective that is designed to be connected to a light microscope and used with an immersion fluid.

Objective front side: The objective front side denotes the end of the immersion objective that faces a sample. During operation, a part of the objective front side should be immersed in immersion fluid.

Objective body: Objective body denotes an encasing or a housing in which optical components, in particular lenses or mirrors, are accommodated. The objective body can consist of more than one part. For example, the objective body can comprise one or more sleeves for supporting the optical components and a distinct outer encasing or support on which the at least one objective-body coupling connection is formed. The specific structure of the objective body is not of decisive importance provided that the components supported by the objective body or via the at least one objective-body coupling connection are ultimately supported by the mechanical mounting connection of the objective (e.g. a bayonet or threaded connection).

An adapter that enables, e.g., a connection to an objective revolver can be considered part of the objective body. A bayonet connection or a bayonet connection configured as an adapter can also be considered part of the objective body in the context of the invention. The objective-body coupling connection can also be formed on the bayonet connection and the immersion fluid tank can be supported via the same. In particular, an orientation of the immersion fluid tank here can be such that it extends in the direction of or on the axis of rotation of the objective revolver. The bayonet connection can comprise a coupling for fluid media with an integrated check valve, whereby there is no leakage of fluids into the bayonet interface when the objective is removed. In order to simplify the use of the objective revolver, a decoupling of the tube can also be provided in the rotation axis of the objective revolver with a rotatable tube coupling.

Support via the objective body denotes that the weight of the corresponding components is borne by the objective body or in conjunction with the objective body via its mounting connection (i.e., for example, via the same e-bayonet connection). These components, in particular the control electronics component, the immersion fluid tank and the pump, are thus not supported on the stand or detached from the objective.

The detachable support via the objective-body coupling connection is intended to denote that a non-destructive demounting is possible, optionally without tools. This can be the case, for example, with plug/socket, magnetic or bayonet connections. For an efficient use of installation space, it can be advantageous for a pump and an immersion fluid tank to be supported via the same electrical and mechanical coupling means on the objective body. In principle, however, it is also possible to provide separate electrical and/or mechanical coupling means on the objective body for the pump and the immersion fluid tank.

Descriptions in the singular are employed for the sake of an easier comprehension and do not necessarily mean that a single component is provided. If, for example, "the pump" is described, further pumps optionally formed in the manner of the described pump may also be provided.

Plug/socket connector: In the context of the present invention, electrical plug/socket connectors may be understood to designate connections which establish an electrical connection by being plugged together. A plug/socket connector here can comprise contact pins pointing outwards and/or contact openings directed inwards. The plug/socket connector can optionally also provide, besides an electrical connection, the mechanical support of a connected component and can in particular be designed as a plug, socket or coupling.

The characteristics described as additional features of the immersion objective, if implemented as intended, also yield variants of the method according to the invention. Conversely, the immersion objective can also be configured to carry out the described method variants.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components:

FIGS. 3A, 3B show different schematic views of a further example embodiment of an immersion objective according to the invention;

FIGS. 4A, 4B show different schematic views of a further example embodiment of an immersion objective according to the invention;

FIG. 10 shows a table in which estimated immersion volumes and other parameters are indicated for different objectives.

DETAILED DESCRIPTION OF EXAMPLE EMBODIMENTS

Example Embodiment of FIGS. 1A-1C and 2A-2C

Figure 1A:
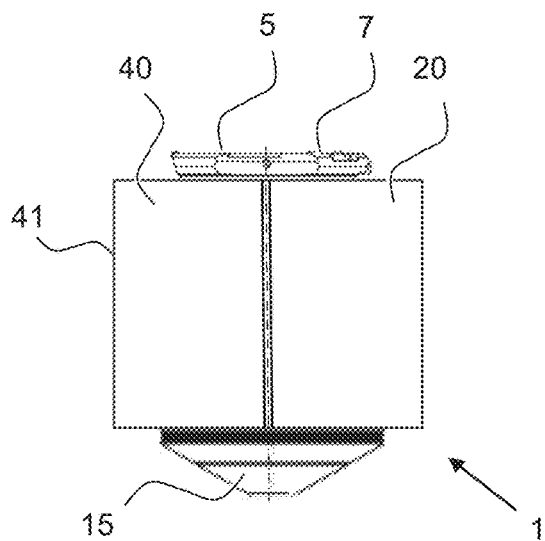
FIGS. 1A-1C show different schematic views of an example embodiment of an immersion objective according to the invention.
Figure 1B:
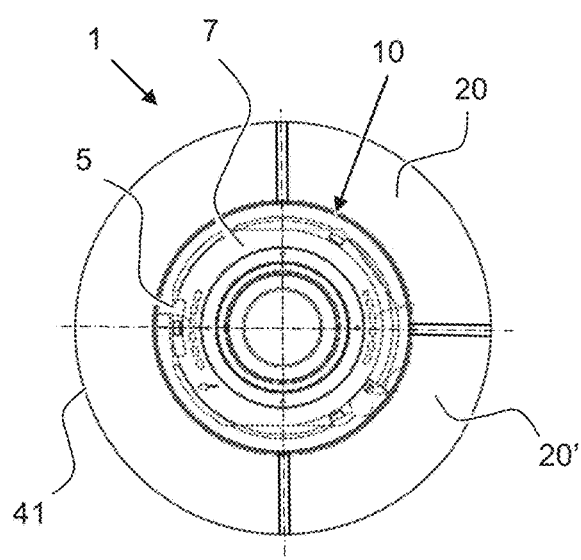
Figure 1C:
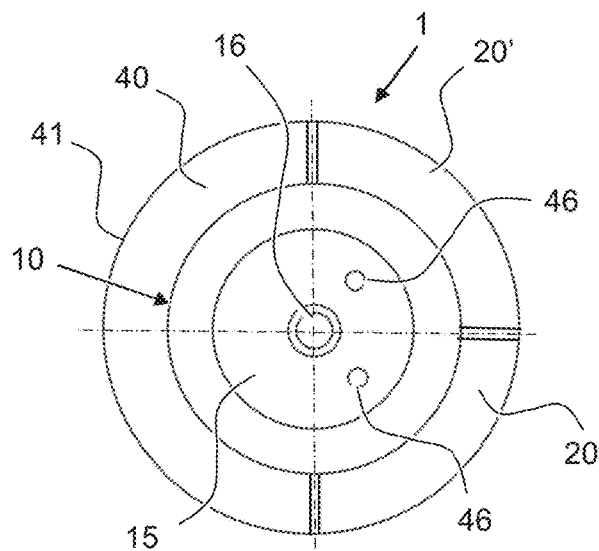

An example embodiment of an immersion objective 1 according to the invention is shown schematically in FIGS. 1A-1C and 2A-2C. FIG. 1A is a side view of the immersion objective 1. FIG. 1B shows a top view of the immersion objective 1, i.e., viewed from the connection side of the immersion objective 1. FIG. 1C is a view from below, i.e., viewed from a sample. The immersion objective 1 can be used in a light microscope. It comprises a mechanical mounting connection 7, for example a bayonet mount or thread with which it can be mounted on an objective revolver or on another mount on a stand of a light microscope. The mechanical mounting connection 7 here also comprises an electrical interface 5, which is provided, for example, in the case of a bayonet connector.

With the immersion objective 1, the annular installation space around its optical-mechanical core system (designated here as the objective body 10) is used efficiently. The potential usable space is generally determined by the spatial conditions on the objective revolver of the microscope and its maximum dimensions must be in a range that there are no collisions with adjacent objectives in cases where the objective revolver is furnished with such. A practicable changing of the immersion objective 1 on upright and inverted microscopes by the user should also be possible. The available space is used efficiently in that two immersion fluid tanks 20, 20' and a control electronics housing 41, in which a control electronics component 40 is located, are supported on the objective body 10. FIGS. 1A-1C show the mounted state of the immersion fluid tanks 20, 20', which respectively have a pump (not illustrated here). A tube respectively runs from each immersion fluid tank 20, 20' to the objective front side 15, wherein FIG. 1C shows the respective tube openings 46 of the tubes. During operation, the tube openings 46 are located laterally next to a front lens 16, which is accommodated in the objective body 10. The immersion fluids can be introduced into the space between the slide and the objective front side 15 via the tube openings 46. The tube openings 46 can be positioned on the objective front side 15 in a manner that is specific to an objective and an immersion fluid, for example depending on the size of the object field and the free working distance that the immersion fluid cone is intended to bridge, or depending on the viscosity of the immersion fluid. The positioning of the tube openings 46 on the objective front side 15 is intended to ensure that a suitable and bubble-free immersion fluid cone can form in a reproducible manner between the front lens 16 and the slide. When the pump is turned off, the immersion fluid remains, regardless of the arrangement of the objective, due to the internal capillary action in the tube.

Figure 2A:
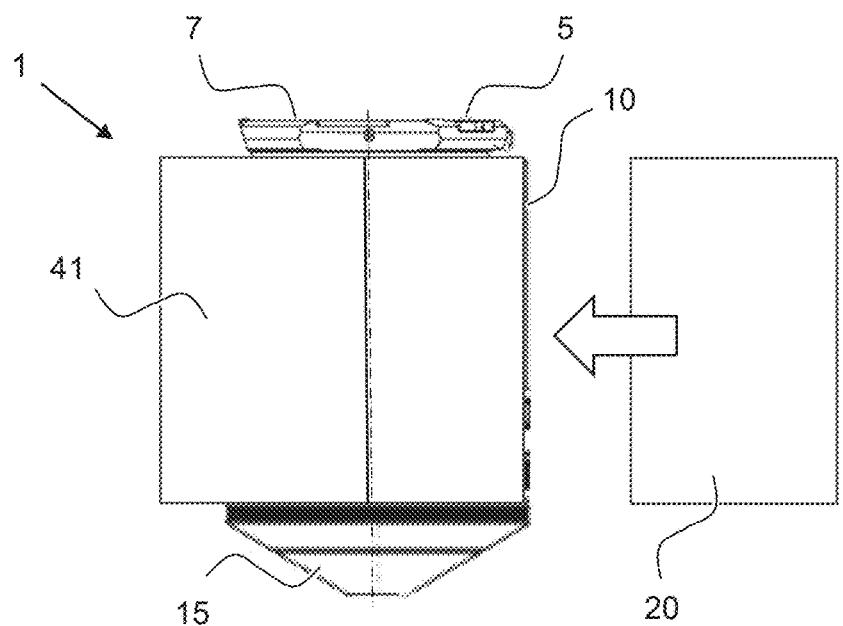
FIGS. 2A-2C show different schematic views of the immersion objective of FIGS. 1A-1C, wherein the immersion fluid tanks are removed.
Figure 2B:
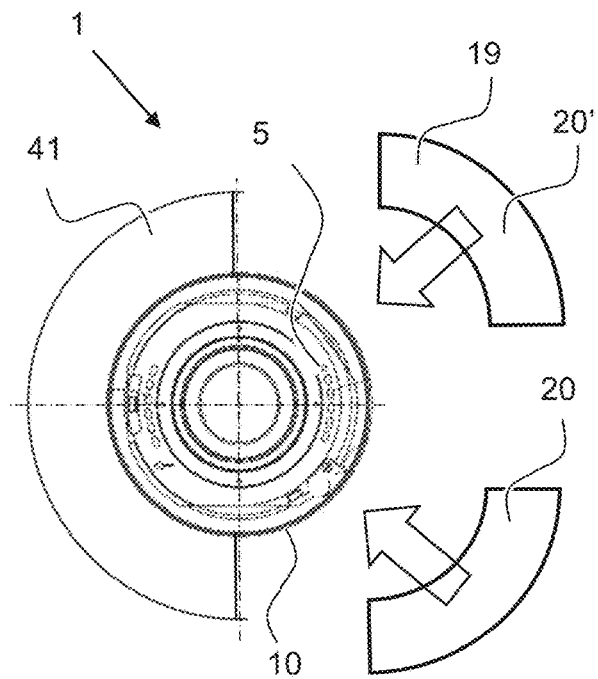
Figure 2C:
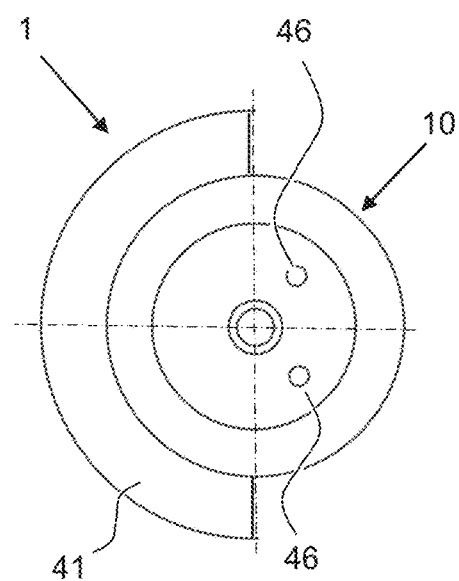

FIGS. 2A, 2B and 2C show a side view, a top view and a bottom view of the immersion objective 1, wherein the immersion fluid tanks 20, 20' are detached from the objective body 10. Arrows illustrate in which direction the immersion fluid tanks 20, 20' can be arranged on the objective body 10. The detachability of the immersion fluid tanks 20, 20' is an important feature for enabling a use of the immersion objective 1 on both upright as well as inverted microscopes, as will be described in greater detail later on. Detachability can also be advantageous for the replacement of the tubes and an optional refilling of the immersion fluid tanks 20, 20'.

Residual Immersion Fluid Tank (FIG. 2B)

As indicated in FIG. 2B, in a variation of the example embodiment described above, an empty tank can act as a residual immersion fluid tank 19 in the place of the immersion fluid tank 20'. Immersion fluid that is no longer required is suctioned from the objective front area into the residual immersion fluid tank 19. This can be the case when the immersion fluid is changed or in the event of a switch to dry objectives. A manual fine cleaning of the objective front area may nevertheless still be necessary. If the residual immersion fluid tank 19 is full, the draining of the residual immersion fluid then occurs via a built-in drain valve. This can occur by means of a manual suctioning using a syringe with an injection needle while the residual immersion fluid tank 19 is removed. A design with an electrically operated drain valve and a pump, however, is more convenient. The residual immersion fluid tank 19 remains mounted on the objective body 10 in this case in order to supply power to the pump. The residual immersion fluid is then pumped via a tube connected to the drain valve into a collection container. The control electronics component can initiate draining automatically as a function of the fill level or prompt a user do so.

Example Embodiment of FIGS. 3A-3B

A further example embodiment of an immersion objective 1 according to the invention is shown schematically in FIGS. 3A-3B. FIG. 3A is a view from above and FIG. 3B is a view from below. This example embodiment differs from the preceding example embodiment inasmuch as a single immersion fluid tank 20 is provided. Accordingly, a sole tube with a tube opening 46 leads to the objective front side 15.

FIG. 3A also shows how the control electronics component 40 can be arranged in a control electronics housing 41. The control electronics housing 41 has a ring segment shape, i.e. it surrounds a part of the objective body 10 in an annular fashion. The control electronics component 40 can extend according to the shape of the housing along an annular section. To this end, a plurality of switchboards 42 can be coupled by flexible connections. Such a design of the control electronics component 40 can also be used with the other example embodiments.

In the illustrated example, the control electronics housing 41 has an outer wall in the shape of a circle segment. Alternatively, this outer wall can also be a segment of an ellipse. This can be the case in particular when a Corr function is realized, wherein the thickness of the slide as well as the refractive index and temperature of the immersion fluid can be corrected by means of internal lens adjustments. An actuator or motor for the lens adjustments can be accommodated in the control electronics housing 41. The control electronics component 40 can be additionally configured for a Corr control, in particular for controlling the actuator/motor for the lens adjustments. Complex workflows are combined in a single objective in this manner. This results in practical advantages for a user, in particular in cases of long-term experiments and under incubation conditions. This way, inter alia, adjustment errors are less frequent and collisions with other components can be avoided.

Example Embodiment of FIGS. 4A-4B

A further example embodiment of an immersion objective 1 according to the invention is shown schematically in FIGS. 4A-4B. FIG. 4A is once again a view from above and FIG. 4B is a view from below. This example embodiment differs from the preceding example embodiments inasmuch as three immersion fluid tanks 20, 20', 20" are provided. According to the number of tanks, three tubes with respective tube openings 46 lead to the objective front side 15 here.

The different example embodiments have in common that the respectively provided immersion fluid tanks 20, 20', 20" form a ring shape in conjunction with the control electronics housing 41. In particular, it is possible to form a closed ring around the objective body 10. This is advantageous for using the space without risking collisions with other microscope components.

One of the immersion fluid tanks 20, 20', 20" can also be used as a flushing fluid/liquid tank while another of the immersion fluid tanks 20, 20', 20" can be used as a residual immersion tank. The flushing fluid tank contains a cleaning agent. For a flushing operation, residual immersion fluid is optionally initially suctioned into the residual immersion fluid tank and cleaning agent is subsequently pumped from the flushing fluid tank to the objective front side and from there finally into the residual immersion fluid tank. These steps can be initiated by the control electronics component 40.

Table of FIG. 10

Which volumes are available for immersion fluids is explained in simplified form below for the illustratively depicted immersion objectives 1. Typical objective parfocal distances are 45, 60 or 75 mm. Considering the specific spatial conditions on the objective revolver or changer, the following internal volumes are conceivable in terms of the structure of each immersion fluid tank (this estimate is calculated by means of an "unrolled" circumference as width×circumference segment×height): 1 immersion fluid tank: 10 mm×40 mm×25 mm=10000 mm$^3$=10000 μl=10 ml 2 or 3 immersion fluid tanks: 10 mm×20 mm×25 mm=5000 mm$^3$=5000 μl=5 ml The table of FIG. 10 relates to typical objectives that have been redesigned in accordance with the invention so that all components necessary for immersions (in particular the immersion fluid tank, pump, control electronics component) are supported via the objective body. Thus, for an immersion objective 1 according to the invention, typical objectives feature the objective body 10 on which the immersion components (immersion fluid tank, pump, control electronics component) are supported.

The table contains the following designations:
10: Type of objective body
β: Magnification or reproduction scale of the respective immersion objective
NA: Aperture of the immersion objective
d: Working distance in mm
V: approximate fluid volume required for an immersion operation in μl.

The necessary fluid volumes V for an immersion are estimated with an immersion cone diameter of approx. 6 mm and the indicated, objective-specific working distances.

The maximum number of immersions possible (initial immersions) per tank filling can be estimated from the volumes indicated in FIG. 10, e.g.: Objective C-Apochromat 10×/0.45 W (51 μl/immersion): approx. 190 immersions with 1 immersion fluid tank or approx. 95 Immersions with 2 or 3 immersion fluid tanks. Objective LCI Plan-Neofluar 63×/1.3 imm Corr PH3 (5 μl/immersion): approx. 2000 immersions with 1 immersion fluid tank or approx. 1000 immersions with 2 or 3 immersion fluid tanks.

This estimate is simplified in that, in reality, immersion fluid also remains in the tubes and in that a tube has to be filled with immersion fluid, for example, in the event of a possible replacement of a tube, at the start of an immersion operation after a longer break in operation or prior to a long-term experiment. In addition, flushing operations for cleaning and deaerating the immersion fluid components are necessary in order to remove potential contaminants or air bubbles. As a result, in practice, the maximum number of immersions possible can end up being lower than estimated above.

The illustrative dimensions of the immersion fluid tanks demonstrate, however, that, even when the additional need for immersion fluid resulting from operation is taken into account, sufficient amounts of immersion fluid can be accommodated directly on the objective. This also applies to long-term experiments using live cell imaging, which are conducted with water immersion and partly under incubation conditions over, e.g., several days. Supplemental immersions may be necessary in such experiments, for example, every 20 min for the replacement of the water that has evaporated from the immersion cone. Supplemental immersions require approximately a third of the water volume of an initial immersion. With the volumes mentioned above, the immersion fluid supply would be entirely sufficient for a five-day experiment with 320 supplemental immersions.

Figure 5A:
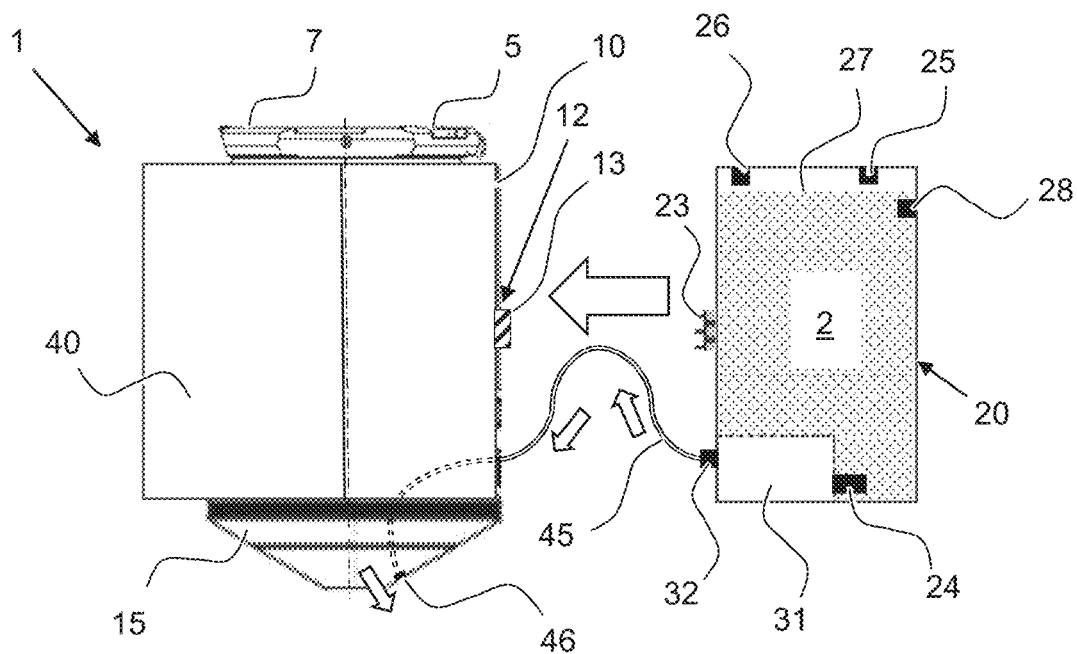
FIG. 5A shows an example embodiment of an immersion objective according to the invention in which the pump is integrated in the immersion fluid tank in an upright arrangement.
Figure 5B:
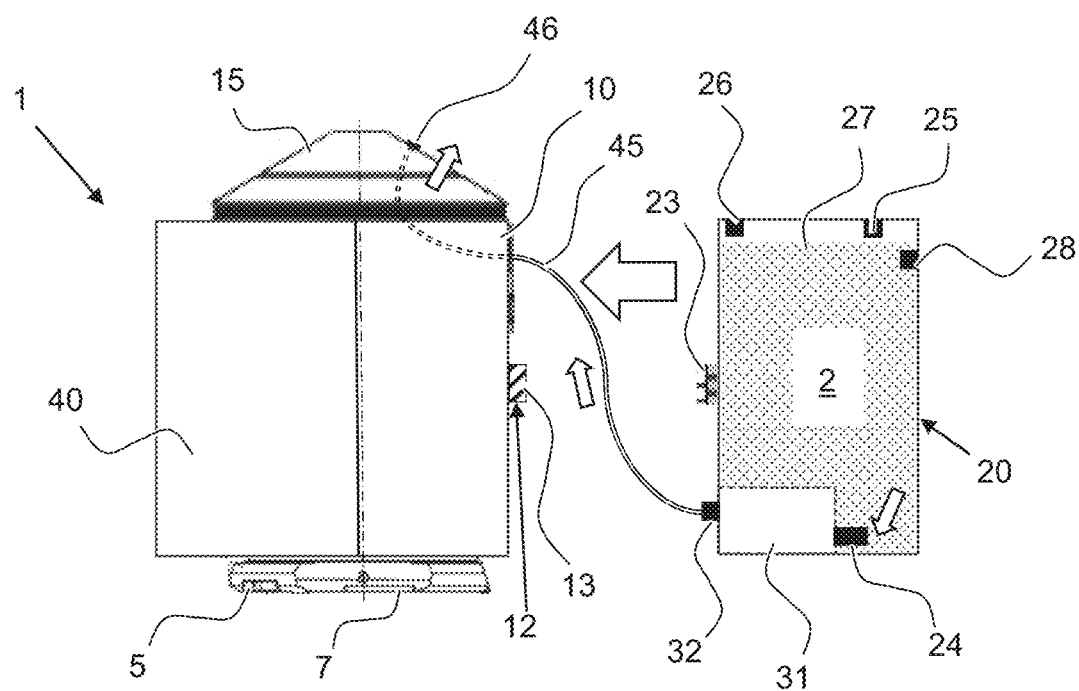
FIG. 5B shows the immersion objective of FIG. 5A in an inverted arrangement.

Example Embodiment of FIGS. 5A and 5B

FIGS. 5A and 5B show a further example embodiment of an immersion objective 1 according to the invention. FIG. 5A shows a side view of the immersion objective 1 in use in an upright microscope, while FIG. 5B shows a side view of an immersion objective 1 in use in an inverted microscope. The immersion fluid tank 20 can be coupled to the objective body 10 in two different orientations in order to render the immersion objective 1 suitable for both cases.

The objective body 10 comprises on its outside an objective-body coupling connection 12 on which the immersion fluid tank 20 is supported.

The objective-body coupling connection 12 can comprise, for example, mechanical interlocking elements, hooks, clips or magnets (not illustrated).

In the illustrated example, the immersion fluid tank 20 is connected to the objective-body coupling connection 12 directly, although in variants an intermediate component can be connected between the objective-body coupling connection 12 and the immersion fluid tank 20.

In the illustrated case, the objective-body coupling connection 12 also comprises an objective-body plug/socket connector 13, which establishes an electrical connection with the immersion fluid tank 20. The objective-body plug/socket connector 13 can also help with the mechanical support of the immersion fluid tank 20 or, depending on its design, also provide mechanical support on its own. For coupling to the objective-body coupling connection 12, the immersion fluid tank 20 comprises a mating plug/socket 23, which is illustratively designed here as a plug connector.

The objective-body coupling connection 12 is located at mid-height on the objective body 10 and is designed to be symmetrically contactable. As illustrated in FIGS. 5A and 5B, it is thereby possible for the same immersion fluid tank 20 to be fixed on the objective body 10 in different orientations in relation to the same. The central height of the objective-body coupling connection 12 ensures that the immersion fluid tank 20 does not protrude beyond the objective front side or the mounting connection 7 in either orientation.

In the side views of FIGS. 5A and 5B, a single immersion fluid tank 20 is visible, although further tanks can optionally also be provided. Depending on the design of the immersion objective 1, views from above and below can thus correspond to FIGS. 2B-2C, FIGS. 3A-3B or FIGS. 4A-4B.

The pump 31 is integrated in the immersion fluid tank 20 here. As a result, merely a single, replaceable tube 45 is necessary for the connection of the tube opening 46 to the objective front area 15. The easy replaceability of the tube 45 by the customer is an important, application-dependent requirement. For the tube 45 can become contaminated or clogged through its use, e.g., in incubation conditions at 37° C. with live cell imaging. A replacement of the tube may also be desirable as a precautionary measure in the event of imminent long-term experiments lasting several days. To this end, the tube 45 can simply be affixed to the tube connector fitting 32 on the side of the tank. On the side of the objective, the tube 45 can be threaded through, for example, a channel provided for this purpose. The channel can be formed on or in the objective body 10. A seal can be provided at the channel in order to prevent a penetration of immersion fluid between the tube 45 and the walls of the channel. The end of the tube 45 with its tube opening 46 can be flush with the objective front area 15.

Different tube lengths would be necessary to reach the objective front side 15 depending on whether the immersion fluid tank 20 is mounted for upright or inverted microscopy. A tube storage area is provided on the immersion objective 1 so that the same tube 45 can nevertheless be used in both cases. A segment of the tube 45 is only supported in the tube stowage area in the event of an upright or an inverted objective orientation (depending on which of these two objective orientations requires the shorter tube length). The tube stowage area can be formed, for example, by an undercut on the immersion fluid tank 20 (not illustrated). An undercut allows a form-fitted and secure fixation or interlocking engagement of the immersion fluid tank 20 on the objective body 10 without the tube 45 interfering. Alternatively, it is also possible to provide clamping elements on an outer wall of the immersion fluid tank 20 or the objective body 10 for stowing a section of the tube 45.

A tube support (not illustrated) which permits two different supported positions of the tube 45 can also be provided. One supported position is used for the upright operation of the microscope, while the other is used for the inverted operation of the microscope. The tube support can in particular be provided on the corresponding immersion fluid tank. It can comprise interlocking elements for clamping the tube and/or a rotatable connecting piece. The rotatable connecting piece can be a miniature tube connector and lock in two rotation positions, for inverted and upright operation.

The immersion fluid tank 20 can comprise a mechanically detachable tank cap. An electronically readable fill-level sensor 26 and an air vent valve 25 can be integrated in the tank cap. The fill-level sensor 26 detects a fill level 27 of the immersion fluid 2 during the immersion operation or during the filling of the immersion fluid tank 20 on the objective body 10. The air vent valve 25 provides compensation for the negative pressure when the immersion fluid is pumped out of the tank without air bubbles during the immersion operation. The air vent valve 25 also effects a compensation for the positive pressure during the filling of the tank. A corresponding refill opening 28, in particular a refill connection with a rubber seal, can be integrated in an outer wall of the immersion fluid tank 20. Analogously to a refillable printer cartridge, filling can occur by means of a syringe injection needle. The pump 31 integrated in the immersion fluid tank 20 and the fill-level sensor 26 or other integrated sensors are connected to the electrical plug/socket connector 23 located on the outside of the immersion fluid tank 20. To this end, insulated electrical connection lines (not illustrated in the drawing) can run along the inner walls of the immersion fluid tank 20. The coupling with the control electronics component 40 occurs via the electrical plug/socket connector 23.

The objective-specific immersion volumes for initial and supplemental immersions can be stored in the control firmware or software of the control electronics component 40. Other software tools for the set-up and maintenance of the immersion device can also be saved in the control electronics component 40, e.g., cleaning or flushing programmes, in particular for the deaeration of the tubes 45.

In a variant of this example embodiment, the refill opening 28 is omitted. In this case, the pump 31 is discarded together with the immersion fluid tank 20 when the latter is empty.

Figure 6:
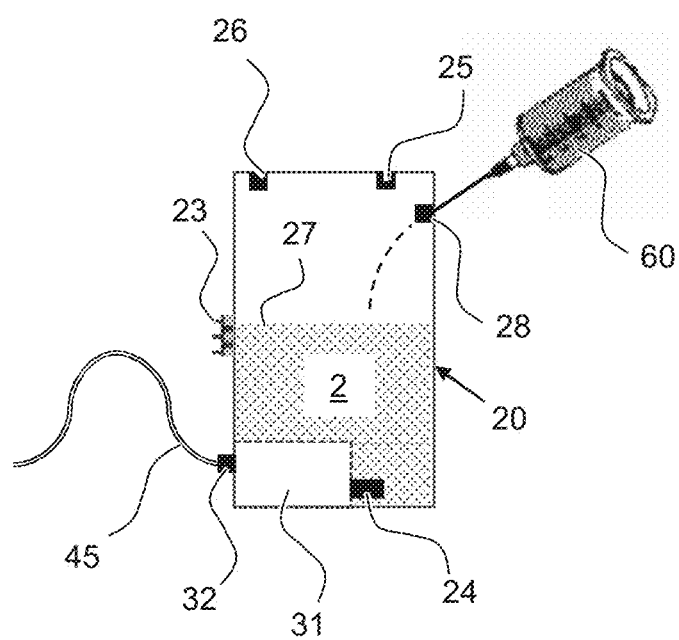
FIG. 6 illustrates a refilling of the immersion fluid tank of one of the illustrative immersion objectives with immersion fluid.

Refilling of an Immersion Fluid Tank According to FIG. 6

FIG. 6 shows the refilling of the immersion fluid tank 20 with immersion fluid 2 by means of a syringe 60 with an injection needle. During this process, the immersion fluid tank 20 can be mounted on the objective body 10 or detached from the same. When filling an empty immersion fluid tank 20 in the detached state, the amount designated for filling the tank is set via the measurement markings on the syringe while drawing the plunger and then completely emptied into the immersion fluid tank 20. When filling an immersion fluid tank 20 mounted on the objective body 10, the filling amount can be monitored in real time via the fill-level sensor 26. A flushing operation initiated by the control electronics component is carried out after the filling of the immersion fluid tank 20. By means of the flushing operation, potentially present air bubbles are removed from the immersion fluid tank 20 and the tube 45.

Figure 7:
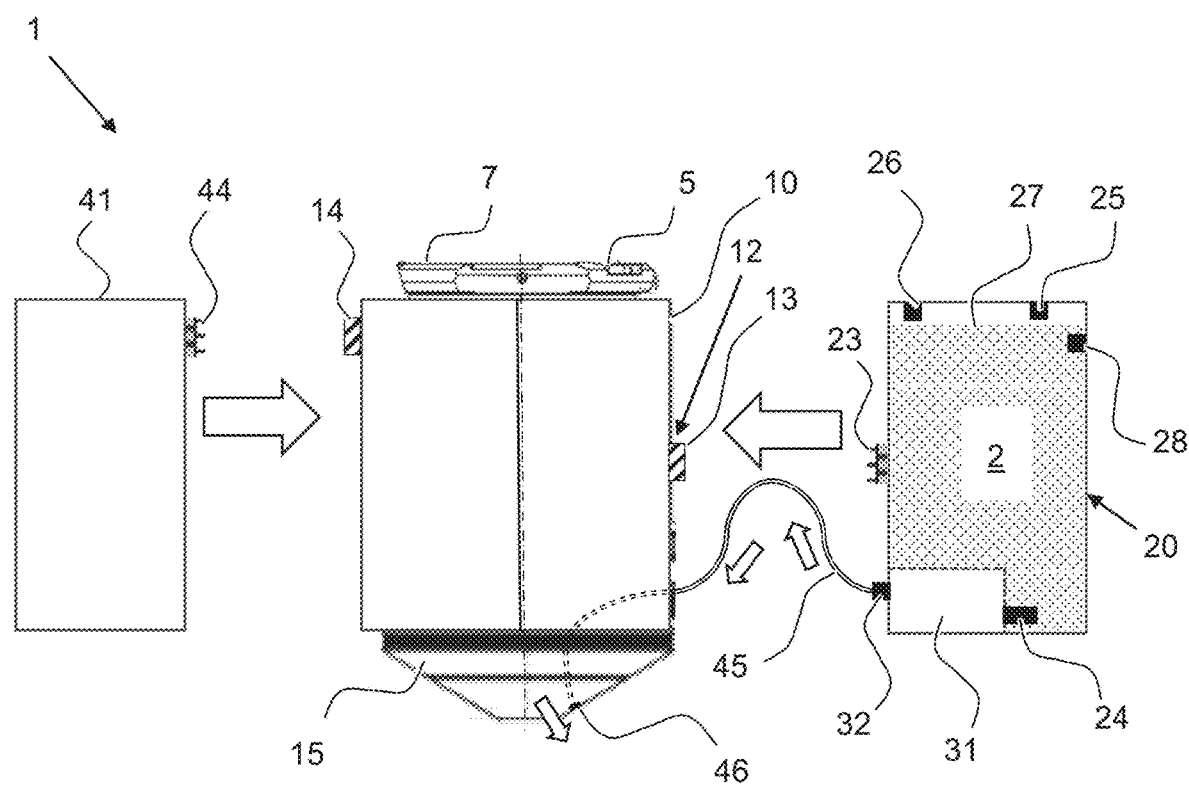
FIG. 7 shows an example embodiment of an immersion objective according to the invention in which the control electronics component is connected to the objective body in a detachable manner.

Example Embodiment of FIG. 7

FIG. 7 shows a further example embodiment of an immersion objective 1 of the invention in a side view. This example embodiment differs from the example embodiment of FIGS. 5A and 5B in that the control electronics housing 41 includes a plug/socket connector 44 by means of which it can be connected to a corresponding plug/socket connector 14 on the objective body 10 in a detachable manner.

Figure 8A:
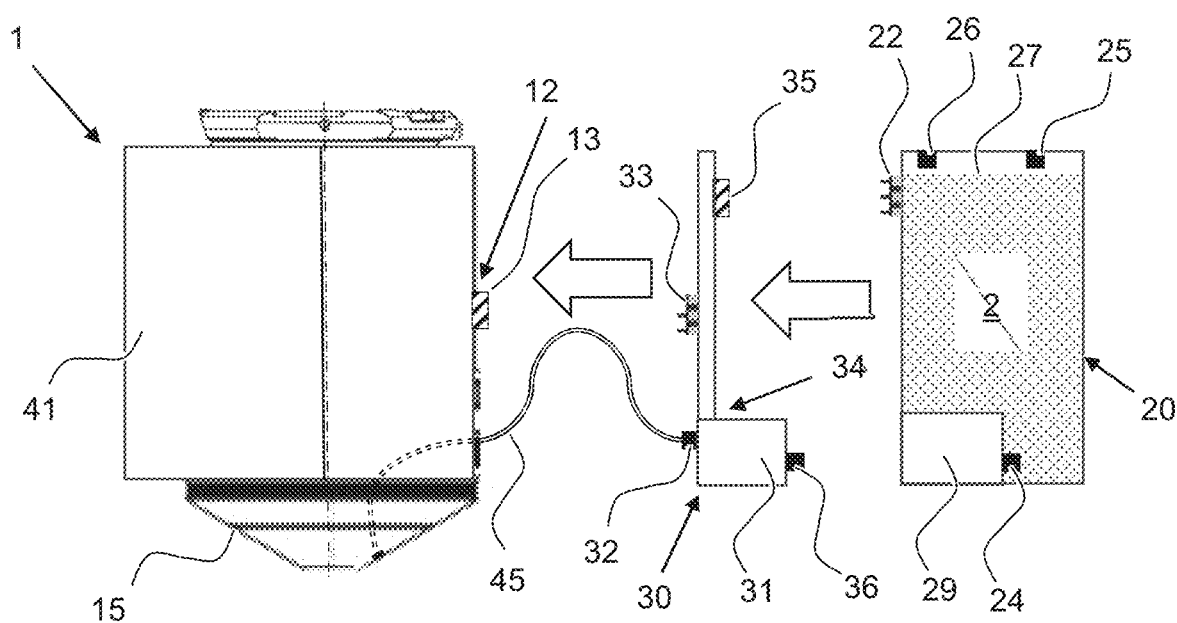
FIGS. 8A, 8B show different schematic views of a further example embodiment of an immersion objective according to the invention in which the pump is designed to be separate from the immersion fluid tank.
Figure 8B:
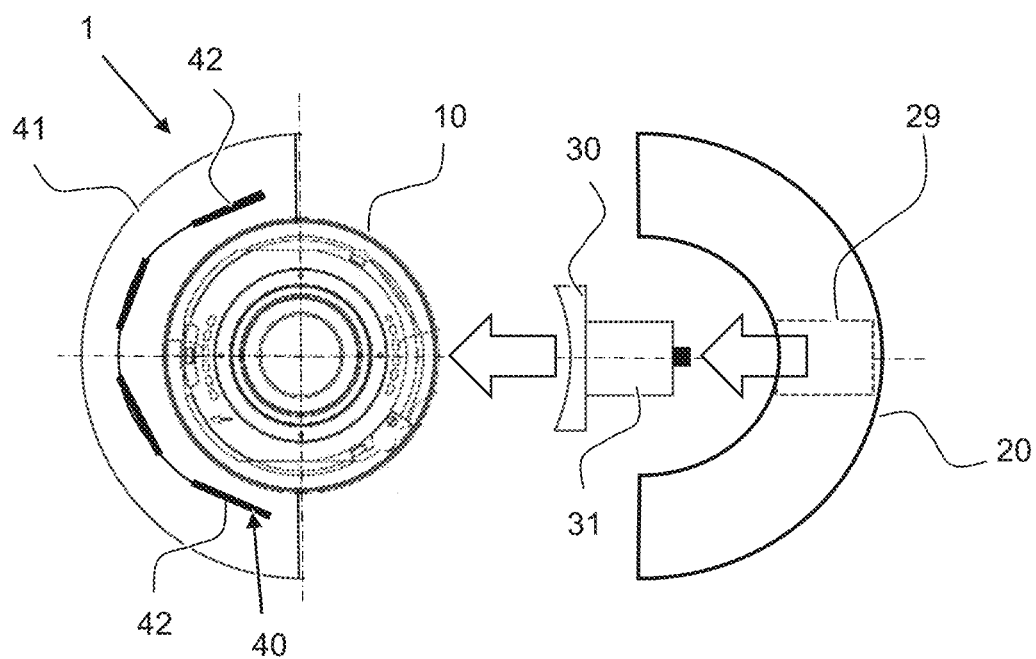

Example Embodiment of FIGS. 8A and 8B

A further example embodiment of an immersion objective 1 of the invention is shown schematically in FIG. 8A in a side view and in FIG. 8B in a top view.

In contrast to the example embodiment of FIGS. 5A and 5B, the pump 31 and the immersion fluid tank 20 are not solidly connected. Rather, a pump adapter 30 is used, which comprises the pump 31 and which can be connected in a detachable manner to both the objective body 10 and the immersion fluid tank 20. To this end, the pump adapter 30 comprises a plug/socket connector, which forms a mating plug/socket 33 matching the plug/socket connector 13 on the objective body 10. Support on the objective body 10 can be provided by means of interlocking elements or magnetically. As shown in FIG. 8B, an inner wall of the pump adapter 30, which faces the objective body 10, can have a concave shape in order to enable a complete surface-to-surface contact with the objective body 10. The pump adapter 30 further comprises a plug/socket connector 35, which can be connected to a mating plug/socket connector 22 on the immersion fluid tank 20.

By separating the pump 31 and the immersion fluid tank 20, the latter can be formed as a cost-effective disposable tank. Disposable tanks can also ensure the availability of correct immersion fluids 2 without contaminants. The immersion fluid tank 20 is thus not coupled to the objective body 10 directly, but rather via the pump adapter 30, via which the immersion fluid tank 20 is also contacted electrically. In particular when used as a disposable tank, the immersion fluid tank 20 can also be designed as a flexible bag.

The pump adapter 30 comprises a support bracket 34 for its mechanical connection to the immersion fluid tank 20. For example, a housing shape designed to be form-fitting relative to the immersion fluid tank 20 can act as the support bracket 34. The immersion fluid tank 20 can in particular comprise a receiving recess 29 into which the part of the pump adapter 30 that contains the pump 31 protrudes in a form-fitted manner. The plug/socket connector 35 can also be part of the mechanical support bracket 34.

The pump adapter 30 comprises a tube connector fitting 32 to which the tube 45 leading to the objective front side 15 can be connected. The pump adapter 30 further comprises a fluid connection 36 that can be connected to a pump coupling 24 of the immersion fluid tank 20. The pump 31 can convey immersion fluid 2 from the immersion fluid tank 20 via said connection. The pump coupling 24 prevents a leakage of fluid when a pump adapter 30 is not hooked up.

In order to enable both an upright as well as an inverted operation, the electrical contact in this case is realized as in the versions described above: the objective-body plug/socket connector 13 is designed to be at mid-height and symmetrically contactable. The mating plug/socket 33 of the pump adapter 30 can be designed in a manner similar to the already described mating plug/socket 23 of the immersion fluid tank of the example embodiments illustrated in the foregoing.

In variations of the example of FIGS. 8A and 8B, a plurality of pump adapters 30, respectively with one immersion fluid tank 20, can also be provided. Pump adapters comprising a plurality of plug/socket connectors 35 and a plurality of pumps 31 so that a plurality of immersion fluid tanks 20 can be connected to the same pump adapter are also possible.

Figure 9A:
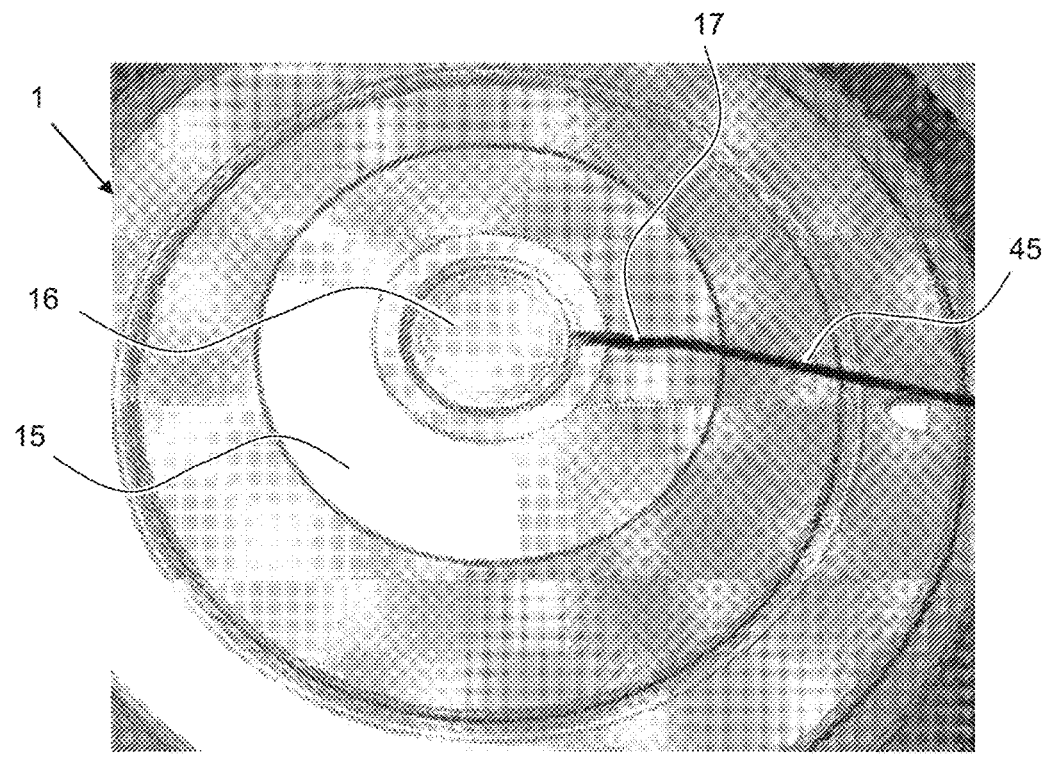
FIG. 9A shows an enlargement of a section of the immersion objective of one of the example embodiments.
Figure 9B:
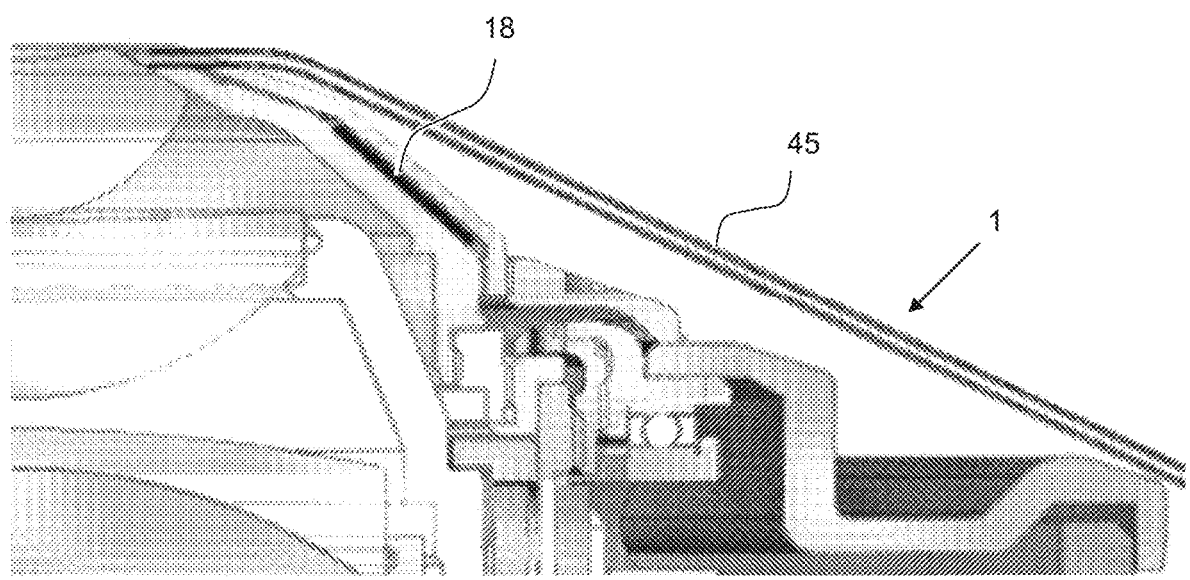
FIG. 9B shows a corresponding sectional view of FIG. 9A.

Tube Guide According to FIGS. 9A and 9B

FIG. 9A shows an enlargement of a section around the objective front side 15. FIG. 9B is a corresponding side view. The design shown here can optionally be provided in any of the example embodiments described above.

FIGS. 9A and 9B show the guiding of the tube 45 to the front lens 16 on the objective front side 15. The tube 45 can be held in a depression or support groove 17 formed on the objective front side 15. Alternatively, instead of the support groove 18, a circumferentially closed tube channel can also be provided, for example a perforation in the objective body 10 or in a front cover of the objective body 10. The support groove 17, however, enables an easier cleaning.

In addition to the support groove 17, a plurality of fixation points can be provided on the objective front side 15 or on the objective body 10 (not illustrated), whereby the tube 45 can be guided in a defined position to the support groove 17.

In the example embodiments described in the foregoing, the tube 45 is formed as one piece. Alternatively, however, the tube 45 can also comprise two tube sections that are connected to each other directly or via intermediate components. One tube section is thus arranged on the objective front side 15, as illustrated in FIGS. 9A and 9B. The other tube section is affixed to the connector fitting on the pump 31 or on the immersion fluid tank 20. The two tube sections are connected at a coupling point. The coupling point can be formed on the objective body 10 so that one tube section corresponds to the section of the tube 45 illustrated in FIGS. 5A and 5B as a dashed line, which can be installed in a channel in the interior of the objective. The other tube section corresponds to the section of the tube 45 illustrated in FIGS. 5A and 5B as solid lines. This way, the guiding of the tube section to the objective front side 15 does not depend on whether there is an upright or inverted operation.

FIG. 9B further shows an optional heating element 18, for example a heating foil, on the objective body 10. In particular the objective front side 15 can be heated by this means. Such a temperature adjustment is especially important in live cell applications, which are typically carried out at 37° C. under incubation conditions, in order to ensure an optimal optical picture quality by means of a temperature-controlled immersion fluid. If the tube 45 is guided next to the heating element 18, the immersion fluid can also already be heated in the tube 45.

The described example embodiments can be varied within the framework of the attached claims. In particular, elements of different example embodiments can be combined, e.g. the described numbers, shapes and arrangements of the immersion fluid tanks. The control electronics housing 41 described as connectable via a plug/socket in one example embodiment can thus also be added to the other example embodiments. Alternatively, the control electronics housing 41 can also respectively be designed as a permanently attached component of the objective body 10.

All of the described example embodiments yield the advantage, inter alia, that a compact arrangement of the essential immersion fluid components directly on the objective is rendered possible. The handling and potential uses of the immersion objective are thus improved significantly.

LIST OF REFERENCES

1 Immersion objective
2 Immersion fluid
5 Electrical interface of the immersion objective
7 Mechanical mounting connection of the immersion objective
  10 Objective body
  12 Objective-body coupling connection
  13 Objective-body plug/socket connector for, e.g., an immersion fluid tank
  14 Objective-body plug/socket connector for the control electronics component
  15 Objective front side
  16 Front optic
  17 Support groove on the objective front side for the tube
  18 Heating element
  19 Residual immersion fluid tank
  20, 20', 20" Immersion fluid tanks
  22 Plug/socket connector of the immersion fluid tank
  23 Mating plug/socket of the immersion fluid tank
  24 Pump coupling 25 Air vent valve
26 Fill-level sensor
27 Fill level of the immersion fluid
28 Refill opening
29 Receiving recess of the immersion fluid tank for the pump
30 Pump adapter
31 Pump
32 Tube connector fitting
33 Mating plug/socket of the pump adapter
34 Support bracket of the pump adapter
35 Plug/socket connector of the pump adapter for the immersion fluid tank
36 Fluid connection of the pump adapter
40 Control electronics component
41 Control electronics housing
42 Flexibly connected circuit boards of the control electronics component
44 Plug/socket connector on the control electronics housing
45 Tube
46 Tube opening on the objective front side
60 Syringe
βMagnification or reproduction scale of an immersion objective
NA Aperture of the immersion objective
d Working distance in mm
V approximate fluid volume of an initial immersion

We claim:
1. An immersion objective, comprising
an objective body in which optical components are accommodated;
at least one immersion fluid tank; and
at least one objective-body coupling connection on the objective body, wherein the at least one objective-body coupling connection is configured to support the at least one immersion fluid tank in a detachable manner;
at least one pump, which is carried by the objective body such that a weight of the at least one pump is carried by the objective body, wherein the at least one pump is arranged in order to convey immersion fluid from the at least one immersion fluid tank to an objective front side; and
a control electronics component, which is carried by the objective body such that a weight of the control electronics component is carried by the objective body, wherein the control electronics component is configured to control the at least one pump.
2. The immersion objective as defined in claim 1,
wherein the at least one pump is supported on the objective body in a detachable manner by the at least one objective-body coupling connection.
3. The immersion objective as defined in claim 1,
wherein the at least one objective-body coupling connection comprises at least one objective-body plug/socket connector via which at least one of the at least one pump or the at least one immersion fluid tank can be electrically connected.
4. The immersion objective as defined in claim 1,
wherein the immersion objective comprises an electrical interface together with a mechanical mounting connection for the attachment of the immersion objective,
wherein the control electronics component is electrically connected to both the electrical interface and the at least one objective-body coupling connection.
5. The immersion objective as defined in claim 1,
wherein the at least one objective-body coupling connection is designed to be symmetrically contactable so that the at least one immersion fluid tank is supportable in different orientations for inverted and upright microscopy, and
wherein the at least one objective-body coupling connection is located at mid-height on the objective body.
6. The immersion objective as defined in claim 1,
wherein the at least one objective-body coupling connection is configured to establish an electrical connection also with components of the at least one immersion fluid tank;
wherein each of the at least one immersion fluid tank comprises a mating plug/socket for connection to the at least one objective-body coupling connection; and
wherein each of the at least one immersion fluid tank comprises a fill-level sensor, which can be electrically connected to the at least one objective-body coupling connection by the mating plug/socket.
7. The immersion objective as defined in claim 1,
wherein the at least one pump is accommodated in the corresponding at least one immersion fluid tank; and
wherein each of the at least one immersion fluid tank comprises an air vent valve arranged on the immersion fluid tank at an end opposite the pump.
8. The immersion objective as defined in claim 1,
wherein each of the at least one immersion fluid tank comprises a collapsing bag with immersion fluid in order to enable a drainability of the immersion fluid tank with both inverted and upright microscopes.
9. The immersion objective as defined in claim 1,
wherein each of the at least one immersion fluid tank comprises a refill opening for the refilling with immersion fluid.
10. The immersion objective as defined in claim 1,
further comprising at least one pump adapter, comprising:
a mating plug/socket for attachment to the at least one objective-body coupling connection;
the pump, which is electrically connected to the mating plug/socket; and
a support bracket for supporting the at least one immersion fluid tank in a detachable manner.
11. The immersion objective as defined in claim 10,
wherein the at least one pump adapter comprises an electrical plug/socket connector and the at least one immersion fluid tank comprises a matching plug/socket connector.
12. The immersion objective as defined in claim 1,
wherein each of the at least one immersion fluid tank has a respective receiving recess in its lower area for receiving the respective pump;
wherein each of the at least one immersion fluid tank comprises a pump coupling in its lower area, which is configured for the fluid connection of the pump and which prevents a leakage of immersion fluid when the pump is not connected; and
wherein the receiving recess for mechanical support is formed on the pump or pump adapter.
13. The immersion objective as defined in claim 1,
wherein the control electronics component is accommodated in a control electronics housing comprising a plug/socket connector, via which the control electronics housing can be electrically connected to and mechanically supported by a plug/socket connector on the objective body; and
wherein the at least one immersion fluid tank and a control electronics housing of the control electronics compo- nent are arranged in the shape of a ring segment around the objective body, wherein the at least one immersion fluid tank and the control electronics housing respectively have an inner side in the shape of a circle segment which fits against the objective body.

14. The immersion objective as defined in claim 1,
wherein at least two immersion fluid tanks with different immersion fluids are arranged on the objective body,
wherein a Y-channel is connected to two of the immersion fluid tanks for mixing the immersion fluids accommodated in the same.

15. The immersion objective as defined in claim 1,
wherein a residual immersion fluid tank is additionally arranged on the objective body,
wherein a residual immersion fluid pump is provided for suctioning immersion fluid from an objective front side to the residual immersion fluid tank, wherein the residual immersion fluid pump is supported by the objective body.

16. The immersion objective as defined in claim 1,
wherein each of the at least one pump comprises a tube connector fitting and at least one replaceable tube is provided, which is connected to the tube connector fitting in a detachable manner and which leads to the objective front side.

17. An immersion microscopy method using an immersion objective, comprising
an objective body, in which optical components are accommodated; and
at least one immersion fluid tank;
wherein the at least one immersion fluid tank is supported in a detachable manner on the objective body by at least one objective-body coupling connection;
wherein the method comprises at least the following processes:
conveying immersion fluid from the immersion fluid tank to an objective front side by means of at least one pump which is carried by the objective body such that a weight of the at least one pump is carried by the objective body; and
controlling the at least one pump by means of a control electronics component carried by the objective body such that a weight of the control electronics component is carried by the objective body.

18. The method as defined in claim 17, further comprising:
refilling the at least one immersion fluid tank via a refill opening on the at least one immersion fluid tank while the immersion objective is in operation mounted on a light microscope.

19. An immersion objective, comprising
an objective body in which optical components are accommodated;
an immersion fluid tank; and
an objective-body coupling connection on the objective body, wherein the objective-body coupling connection is configured to support the immersion fluid tank in a detachable manner;
a pump, which is supported by the objective body, wherein the pump is arranged in order to convey immersion fluid from the immersion fluid tank to an objective front side; and
a control electronics component, which is supported by the objective body, wherein the control electronics component is configured to control the pump;
wherein the objective-body coupling connection is designed to be symmetrically contactable so that the immersion fluid tank is supportable in different orientations for inverted and upright microscopy, and
wherein the objective-body coupling connection is located at mid-height on the objective body.

20. The immersion objective as defined in claim 19,
further comprising a pump adapter, comprising:
a mating plug/socket for attachment to the objective-body coupling connection;
the pump, which is electrically connected to the mating plug/socket; and
a support bracket for supporting the immersion fluid tank in a detachable manner.

\* \* \* \* \*